(12) United States Patent
Hasselbusch et al.

(10) Patent No.: US 9,126,645 B2
(45) Date of Patent: Sep. 8, 2015

(54) TRACK CHAIN CARTRIDGE HAVING THRUST BEARINGS

(75) Inventors: Michael Hasselbusch, Metamora, IL (US); Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 295 days.

(21) Appl. No.: 13/532,278

(22) Filed: Jun. 25, 2012

(65) Prior Publication Data

US 2013/0002010 A1 Jan. 3, 2013

Related U.S. Application Data

(60) Provisional application No. 61/501,879, filed on Jun. 28, 2011.

(51) Int. Cl.
*B62D 55/21* (2006.01)
*B62D 55/088* (2006.01)

(52) U.S. Cl.
CPC ............ *B62D 55/21* (2013.01); *B62D 55/0887* (2013.01)

(58) Field of Classification Search
CPC ............................ B62D 55/21; B62D 55/0887
USPC .......... 305/103, 104, 105, 106, 200, 201, 202
See application file for complete search history.

(56) References Cited

U.S. PATENT DOCUMENTS

| | | | | |
|---|---|---|---|---|
| 3,492,054 A | * | 1/1970 | Boggs et al. | 305/103 |
| 4,132,418 A | | 1/1979 | Roli | |
| 5,183,318 A | * | 2/1993 | Taft et al. | 305/185 |
| 6,564,539 B2 | * | 5/2003 | Bedford et al. | 59/7 |
| 6,739,680 B2 | | 5/2004 | Hasselbusch et al. | |
| 6,883,876 B2 | * | 4/2005 | Yamamoto et al. | 305/115 |
| 7,347,513 B2 | * | 3/2008 | Johannsen et al. | 305/203 |
| 7,959,239 B2 | * | 6/2011 | Diekevers et al. | 305/104 |
| 8,172,342 B2 | * | 5/2012 | Diekevers et al. | 305/194 |
| 2002/0062638 A1 | * | 5/2002 | Bedford et al. | 59/7 |
| 2008/0231110 A1 | * | 9/2008 | Mulligan et al. | 305/103 |
| 2009/0102281 A1 | * | 4/2009 | Diekevers et al. | 305/104 |
| 2009/0108541 A1 | * | 4/2009 | Beardsley et al. | 277/579 |
| 2010/0148575 A1 | | 6/2010 | Johannsen et al. | |
| 2011/0049975 A1 | * | 3/2011 | Mulligan | 305/196 |
| 2012/0056472 A1 | * | 3/2012 | Grenzi | 305/104 |
| 2012/0068530 A1 | * | 3/2012 | Grenzi | 305/104 |

FOREIGN PATENT DOCUMENTS

WO 2009120593 A2 10/2009
WO 2011050258 A2 4/2011

* cited by examiner

*Primary Examiner* — Kip T Kotter
(74) *Attorney, Agent, or Firm* — Finnegan, Henderson, Farabow, Garrett & Dunner, LLP (57) ABSTRACT

A cartridge for a track chain is disclosed. The cartridge includes a track pin. The cartridge also includes a rotatable bushing and a rotatable bearing located on the track pin. The cartridge further includes a first thrust bearing located on the track pin between the bearing and the bushing. The first thrust bearing is configured to contact the rotatable bearing and configured to contact the rotatable bushing. The first thrust bearing is configured to bear thrust loads and not radial loads. The cartridge may further include a collar located at an end of the track pin. The cartridge includes a second thrust bearing located between the bearing and the collar. The second thrust bearing is configured to contact the rotatable bearing and configured to contact the collar. The second thrust bearing is configured to bear thrust loads and not radial loads.

18 Claims, 5 Drawing Sheets

FIG. 5
TRACK CHAIN CARTRIDGE HAVING THRUST BEARINGS

PRIORITY

This application claims the benefit of priority of U.S. Provisional Application No. 61/501,879, filed on Jun. 28, 2011, the contents of which are herein incorporated by reference.

TECHNICAL FIELD

The present disclosure relates generally to a track chain for a track laying machine and, more particularly, to a cartridge having thrust bearings for a track chain.

BACKGROUND

Mobile machines are often needed in adverse conditions and on rugged terrain. One way to deal with these conditions is with the use of a track-type machine. A track-type machine utilizes articulating track chains to engage the ground and propel the machine. Since the track chains are the interface point between the machine and the ground, the track chains are directly exposed to destructive forces, such as abrasive mixtures of water, dirt, sand, rock and chemical elements. The track chains are also exposed to large forces and torques. Failure of a track chain can lead to significant losses in productivity. Consequently, manufacturers of track-type machines have sought to improve the durability of the track chains.

One method of improving track chain design and durability is disclosed in U.S. Pat. No. 6,739,680 (the '680 patent). The '680 patent discloses a cartridge assembly for a track chain assembly. The cartridge assembly of the '680 patent includes a bushing rotatably positioned about a track pin. Bearing members are positioned about the track pin adjacent the bushing. Collars are positioned about the track pin adjacent the bearing members. Seal arrangements are positioned between the collars and the bearing members and between the bearing members and the track bushing for excluding contaminants and retaining a lubricating fluid.

Although the device of the '680 patent may improve the durability of a track chain, it may still be improved further. For example, rotation of the bearing members relative to the bushing (e.g., when bushing is constrained from rotating due to contact with an external object) may produce galling in a side wall of the bushing over time. This disclosure is directed at overcoming the problems described above and/or other problems associated with track chains.

SUMMARY

In one aspect, the present disclosure is directed to a cartridge for a track chain. The cartridge may include a track pin. The cartridge may also include a rotatable bushing and a rotatable bearing located on the track pin. The cartridge may further include a first thrust bearing located on the track pin between the rotatable bearing and the rotatable bushing. The first thrust bearing may be configured to contact the rotatable bearing and configured to contact the rotatable bushing. The first thrust bearing may be configured to bear thrust loads and not radial loads. The cartridge may further include a collar located at an end of the track pin. The cartridge may include a second thrust bearing located between the rotatable bearing and the collar. The second thrust bearing may be configured to contact the rotatable bearing and configured to contact the collar. The second thrust bearing may be configured to bear thrust loads and not radial loads.

In another aspect, the present disclosure is directed to another cartridge for a track chain. The cartridge may include a track pin. The cartridge may also include a bushing located on the track pin. The cartridge may further include a first bearing located on the track pin on a first side of the bushing, and a second bearing located on the track pin on a second side of the bushing. The cartridge may include a first collar located on a first end of the track pin, and a second collar located on a second end of the track pin. The cartridge may further include a first thrust bearing configured to contact the first bearing and configured to contact the bushing, a second thrust bearing configured to contact the first bearing and configured to contact the first collar, a third thrust bearing configured to contact the bushing and configured to contact the second bearing, and a fourth thrust bearing configured to contact the second bearing and configured to contact the second collar. The first, second, third, and fourth thrust bearings may be configured to bear thrust loads and not radial loads

DETAILED DESCRIPTION

Figure 1:
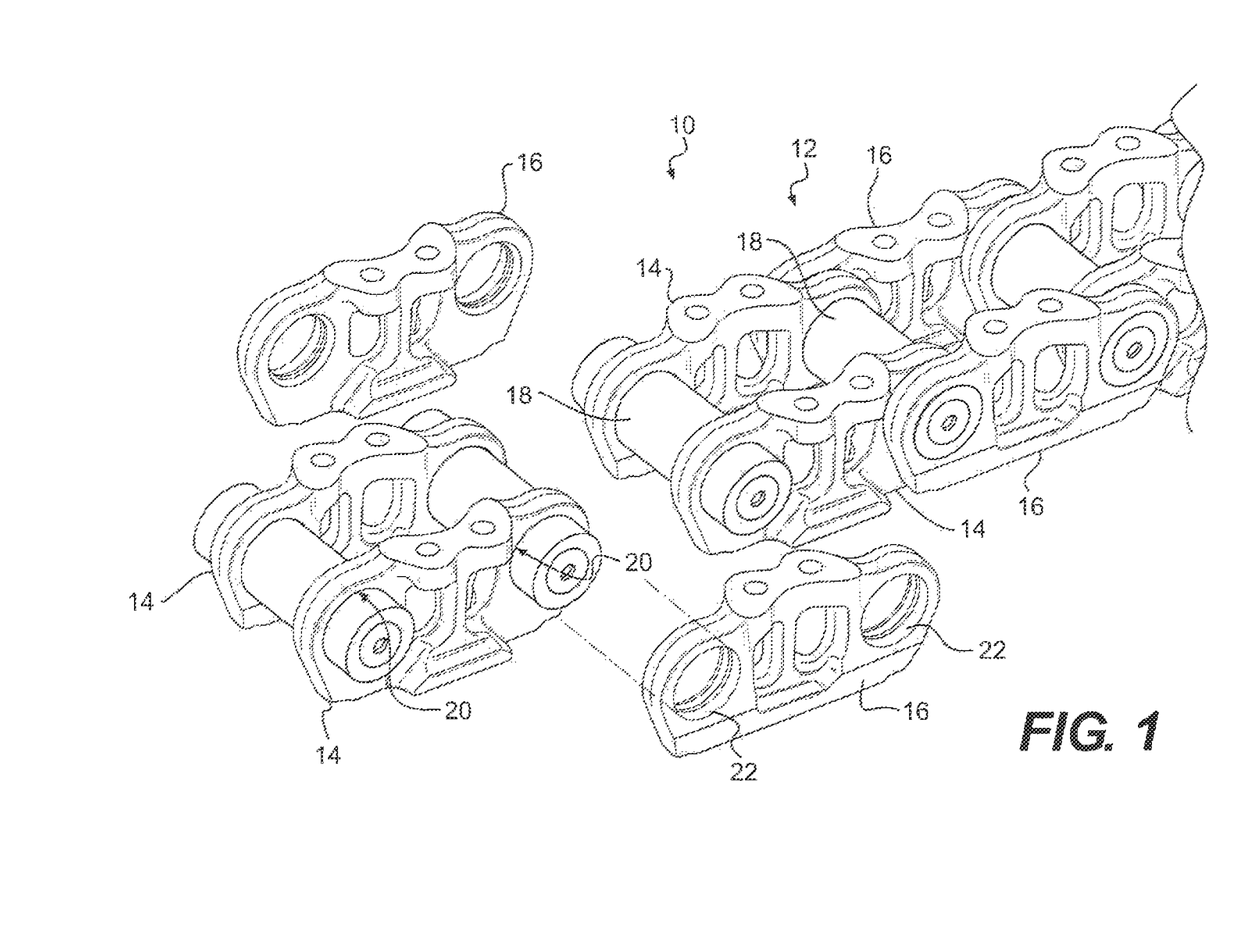
FIG. 1 is an illustration of a track chain.

FIG. 1 shows a portion of a track chain 10. One or more track chains 10 may be utilized on a track-type machine. The track-type machine may be a loader, an excavator, a tractor, a tank, or another mobile machine having track-type traction devices. The track-type machine may use track chain 10 to engage the ground and move the track-type machine. In some embodiments, the track-type machine may include a pair of track chains 10 (one on each side of the track-type machine).

Track chain 10 may be composed of a plurality of track chain subassemblies 12. Track chain 10 may be formed by mechanically coupling multiple subassemblies 12 together to form a closed loop. Utilizing a greater number of subassemblies 12 will increase the size of the loop, while removing subassemblies 12 will decrease the size of the loop. Typically, a track chain 10 has a predetermined length for a given application. Each subassembly 12 may include a pair of inner links 14, a pair of outer links 16, and a cartridge 18.

Inner link 14 may have a length substantially similar to a length of outer link 16. Alternatively, inner link 14 may be either longer or shorter than outer link 16. Both inner link 14 and outer link 16 may be composed of a metallic material, such as steel. Each inner link 14 may include two apertures 20. Each outer link 16 may include two apertures 22. Apertures 20 and 22 may be sized and configured to receive cartridge 18.

Figure 2:
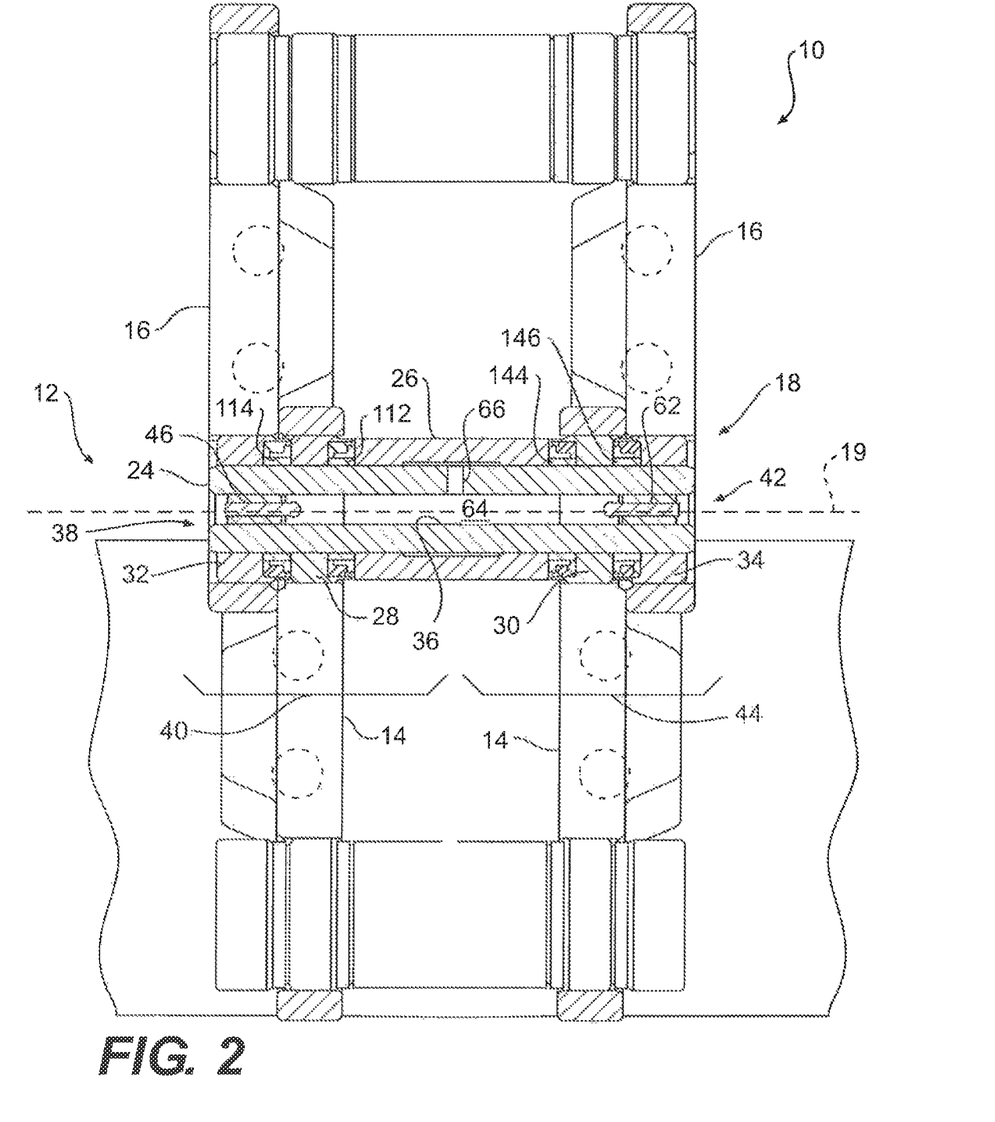
FIG. 2 is a diagrammatic illustration of a track chain with a partial cross-sectional view of a cartridge of the track chain.

As shown in FIG. 2, cartridge 18 may be a cross member that connects inner links 14 and outer links 16 together. Cartridge 18 may also allow for rotation of inner links 14 relative to outer links 16 about a central axis 19. Cartridge 18 may include a track pin 24, a bushing 26, a first and second bearing 28, 30, a first and second collar 32, 34, and a first, second, third, and fourth thrust bearings 112, 114, 144, 146. Cartridge 18 may have a first end 40 and a second end 44 that are symmetric.

Track pin 24 includes a bore 36, a reservoir 64, and a fluid passageway 66. Bore 36 may be centered within track pin 24 and may extend along a longitudinal dimension of track pin 24 (i.e., along central axis 19). Bore 36 may extend completely through track pin 24, thus defining a first opening 38 at an axially outermost portion of first end 40. Bore 36 may also define a second opening 42 at an axially outermost portion of second end 44. Bore 36 may be substantially symmetrical. In one embodiment, bore 36 may have a circular cross section and be cylindrical in shape. Alternatively, bore 36 may have a rectangular, polygonal, or any other appropriate cross-section.

First opening 38 may be configured to receive a first plug 46. First plug 46 may have a shape that is complimentary to the cross sectional shape of bore 36. For example, if bore 36 is cylindrical, first plug 46 may also be cylindrical. If bore 36 is rectangular, first plug 46 may be rectangular. First plug 46 may be sized such that it passes entirely within bore 36. In other words, an outside diameter and a length of first plug 46 may be configured such that first plug 46 passes into bore 36 and seals bore 36 within first end 40. A second plug 62 may be substantially the same as first plug 46 except that it may be received in second end 44.

Figure 3:
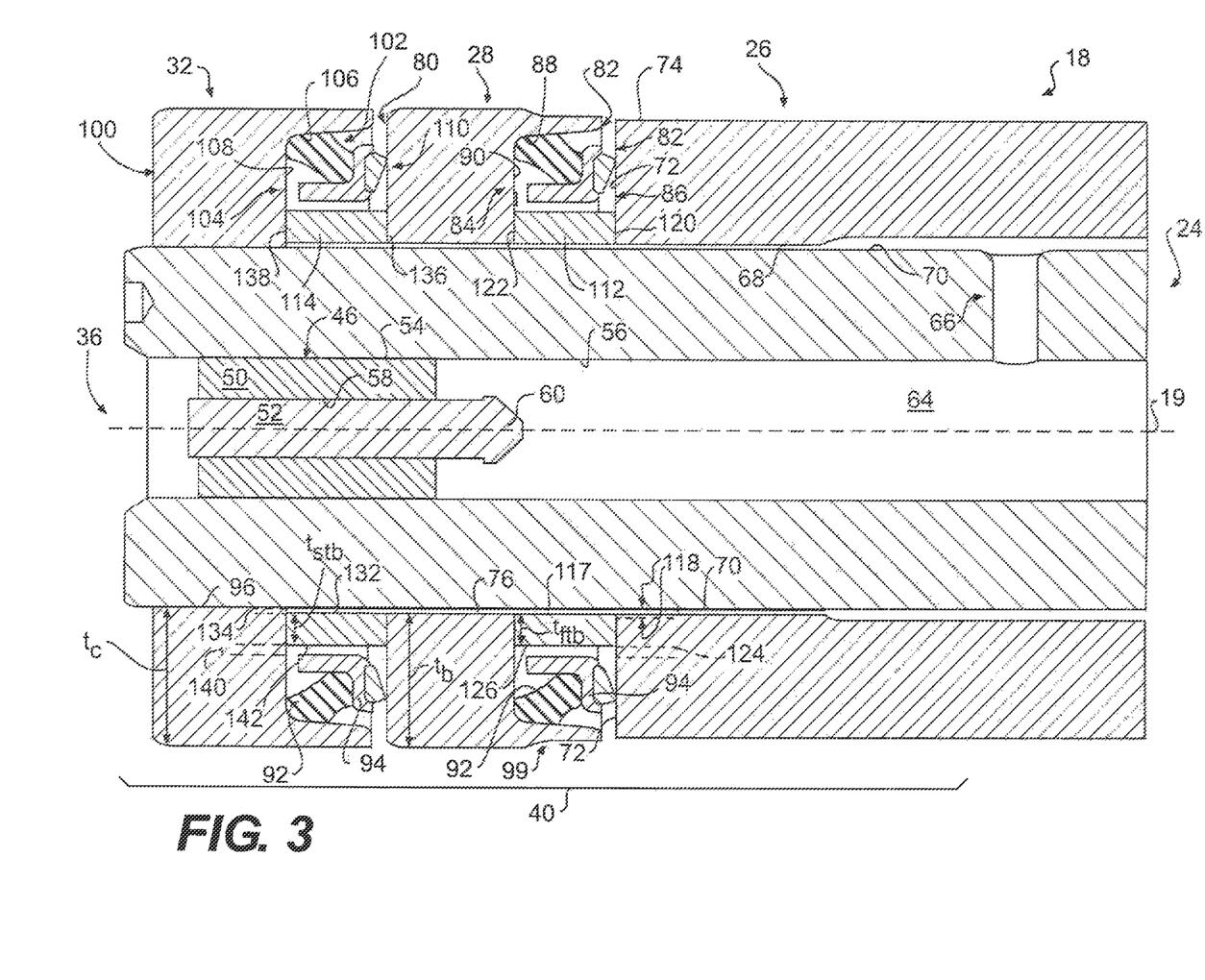
FIG. 3 is a cross-sectional view of one end of a cartridge.

FIG. 3 shows first end 40 of cartridge 18. Since cartridge 18 is substantially symmetrical (i.e., second end 44 is essentially a mirror image of first end 40), only first end 40 is described herein in certain sections. All details provided about the elements of first end 40 apply equally to the complimentary elements of second end 44.

As can be seen in FIG. 3, first plug 46 may include two components. Specifically, first plug 46 may include an interior sleeve 50 and a stopper 52. An outer surface 54 of interior sleeve 50 may contact an inner surface 56 of bore 36. Specifically, outer surface 54 may mate and/or attach to inner surface 56 via welding, adhesives, interference fit, or in any other appropriate manner known in the art. In some embodiments, sleeve 50 may be cylindrical, defining a central passageway 58 configured to receive stopper 52. It is contemplated that stopper 52 may be a shaft-like member composed of rubber, plastic, or another compliant or deformable material. Stopper 52 may include a nub 60 on one end. Nub 60 may prevent stopper 52 from displacing axially in a direction away from cartridge 18.

Reservoir 64 may be a fluid reservoir configured to hold lubricating fluid. Reservoir 64 may be defined by inner surface 56 and ends of first plug 46 and second plug 62. Reservoir 64 may be filled or refilled by removing a stopper 52 and introducing lubricating fluid.

Fluid passageway 66 may channel fluid from reservoir 64 to rotatable components of cartridge 18 (e.g., first and second bearings 28, 30). Fluid passageway 66 may be a cross bore oriented radially with respect to central axis 19. In some embodiments, track pin 24 may include a plurality of fluid passageways 66 to allow for an increased or more even distribution of lubricating fluid. For example, track pin 24 may include a fluid passageway 66 every 180 degrees, 90 degrees, 60 degrees, or 45 degrees. Fluid passageway 66 may have a substantially cylindrical shape.

Bushing 26 may be a cylindrical or tubular member situated on track pin 24. Bushing 26 may be axially located in a generally central position with respect to first end 40 and second end 44. Bushing 26 may include an inner surface 68 that faces an outer surface 70 of track pin 24. Bushing 26 may also include side faces 72 and an outer surface 74. Bushing 26 may be sized to produce a clearance space between inner surface 68 and outer surface 70. Lubricating fluid may pass through this clearance space along a length of bushing 26. Bushing 26 may be rotatable with respect to track pin 24, and the lubricating fluid may facilitate rotation thereof. Alternatively, bushing 26 may be fixed with respect to track pin 24 via mechanical fasteners or other appropriate means.

First bearing 28 may be a rotatable member configured to rotate about track pin 24. First bearing 28 includes an inner bore defining an inner surface 76. Inner surface 76 may face outer surface 70 of track pin 24. A gap may exist between inner surface 76 and outer surface 70, allowing relative rotation between each surface. Lubricating fluid may flow into the gap between inner surface 76 and outer surface 70, thus reducing any friction between inner surface 76 and outer surface 70.

First bearing 28 may connect to inner link 14 (see FIG. 2). Specifically, first bearing 28 may include an outer surface that contacts an inner surface of inner link 14. First bearing 28 may connect to inner link 14 via mechanical fasteners, adhesives, welding, friction fitting, or in any other appropriate manner. First bearing 28 may allow inner link 14 to rotate about central axis 19.

Referring to FIG. 3, first bearing 28 may also include a first face 80 and a second face 82. First face 80 may be substantially planar from inner surface 76 to the outer surface of first bearing 28. A radially interior portion of second face 82 may contact a first thrust bearing 112. Second face 82 may be defined by a cutout 84 defining an upper surface 88 and a lateral surface 90. Lateral surface 90 may be substantially planar from inner surface 76 to upper surface 88. In some embodiments, upper surface 88 may taper away from central axis 19. Cutout 84 may be a substantially annularly shaped void created in first bearing 28 to house a first seal arrangement 86. As noted previously, second bearing 30 may be substantially the same as first bearing 28.

First seal arrangement 86 may be configured to help retain lubricating fluid within cartridge 18. First seal arrangement 86 includes an annular load ring 92 and a seal member 94. Load ring 92 and seal member 94 may be positioned in cutout 84 so that load ring 92 urges seal member 94 in an axial direction outward from cutout 84. The taper of upper surface 88 in the above-described manner facilitates insertion of load ring 92 and seal member 94 into cutout 84. Load ring 92 may be composed of, for example, a polycarbonite compound. Seal member 94 may be composed of, for example, a polyurethane compound. Both the load ring 92 and the seal member 94, however, may be made from other materials without altering the functional aspects of the design.

First collar 32 may be a non-rotatable component configured to prevent axial displacement of first bearing 28 and bushing 26. First collar 32 may connect to track pin 24 via a friction fit, mechanical fasteners, adhesives, welding, or in any other appropriate manner. In embodiments where first collar 32 is friction fit on track pin 24, an inner surface 96 of first collar 32 may contact outer surface 70 of track pin 24. Inner surface 96 and/or outer surface 70 may include surface features, such as knurling, to enhance the friction fit. As noted previously, second collar 34 may be substantially the same as first collar 32.

First collar 32 may connect to outer link 16 (see FIG. 2). Specifically, first collar 32 may include an outer surface that contacts an inner surface of outer link 16. First collar 32 may connect to outer link 16 via mechanical fasteners, adhesives, welding, friction fitting, or in any other appropriate manner.

Referring to FIG. 3, it is contemplated that the outer surfaces of first collar 32 and first bearing 28 may be flat (i.e., parallel to axis 19). Alternatively, the outer surfaces of first collar 32 and/or first bearing 28 may include protruded or indented portions 99. In one embodiment, the outer surface of first bearing 28 may include an indented or protruded portion 99 and the outer portion of first collar 32 may be flat.

First collar 32 may also include a first face 100 and a second face 102. First face 100 may be substantially planar from inner surface 96 to the outer surface of first collar 32. A radially interior portion of second face 102 may contact a second thrust bearing 114. Second face 102 of first collar 32 may include a cutout 104 defining an upper surface 106 and a lateral surface 108. Lateral surface 108 may be substantially planar from inner surface 96 to upper surface 106. In some embodiments, upper surface 106 may taper away from central axis 19. Cutout 104 may be a substantially annularly shaped void created in first collar 32 to house a second seal arrangement 110. Second seal arrangement 110 may be substantially the same as first seal arrangement 86 (e.g., it may include a load ring 92 and a seal member 94).

First thrust bearing 112 may be a rotatable cylindrical member with a center bore defining an inner surface 117. An inner diameter of first thrust bearing 112 may be slightly larger than an outer diameter of track pin 24, thus leaving an inner gap 118. Inner gap 118 may be in the range of about 0.1-0.5 mm. In some embodiments, inner gap 118 may be about 0.3 mm. Inner gap 118 may allow lubricating fluid to pass between inner surface 117 of first thrust bearing 112 and outer surface 70 of track pin 24.

First thrust bearing 112 and first seal arrangement 86 may be sized such that an outer gap 124 remains between a radially outermost surface 126 of first thrust bearing and a radially innermost surface of first seal arrangement 86. Outer gap 124 may range from about 0.2-1.0 mm. In some embodiments, outer gap 124 may be about 0.5 mm. Outer gap 124 may ensure that first thrust bearing 112 does not contact first seal arrangement 86 even when first thrust bearing 112 is in a most radially extended position.

First thrust bearing 112 may be configured to bear thrust loads transmitted between bushing 26 and first bearing 28. First thrust bearing 112 may be configured to not bear radial loads. A first side face 120 of first thrust bearing 112 may be configured to contact side face 72 of bushing 26. A second side face 122 of first thrust bearing 112 may be configured to contact a radially interior portion of lateral surface 90 of first bearing 28. No structure may contact outer surface 126 of first thrust bearing 112. It is contemplated that a ratio of a radial thickness of first thrust bearing 112 ($t_{fb}$) and a radial thickness of first bearing 28 ($t_b$) may be about 0.25 to 0.5. The disclosed radial thickness will provide sufficient space for sealing arrangement 86, while still preventing instabilities that may be created using lesser thicknesses for first thrust bearing 112.

Similar to first thrust bearing 112, second thrust bearing 114 may be a rotatable cylindrical member with a center bore defining an inner surface 132. An inner diameter of second thrust bearing 114 may be slightly larger than an outer diameter of track pin 24, thus leaving an inner gap 134. Inner gap 134 may be in the range of about 0.1-0.5 mm. In some embodiments, inner gap 134 may be about 0.3 mm. Inner gap 134 may allow lubricating fluid to pass between inner surface 132 of second thrust bearing 114 and outer surface 70 of track pin 24.

Second thrust bearing 114 and second seal arrangement 110 may be sized such that an outer gap 140 remains between a radially outermost surface 142 of second thrust bearing 114 and a radially innermost surface of second seal arrangement 110. Outer gap 140 may range from about 0.2-1.0 mm. In some embodiments, outer gap 140 may be about 0.5 mm. Outer gap 140 may ensure that second thrust bearing 114 does not contact second seal arrangement 110, even when second thrust bearing 114 is in a most radially extended position. It is contemplated that a size of inner gap 118 may differ from inner gap 134, and a size of outer gap 124 may differ from outer gap 140.

Second thrust bearing 114 may be configured to bear thrust loads transmitted between first bearing 28 and first collar 32. Second thrust bearing 114 may be configured to not bear radial loads. A first side face 136 of second thrust bearing 114 may be configured to contact a first face 80 of first bearing 28. A second side face 138 of second thrust bearing 114 may be configured to contact a radially interior portion of lateral surface 108 of first collar 32. No structure may contact outer surface 142 of second thrust bearing 114. It is contemplated that a ratio of a radial thickness of second thrust bearing 114 ($t_{stb}$) and a radial thickness of first collar 32 ($t_c$) may be about 0.25 to 0.5.

Figure 4:
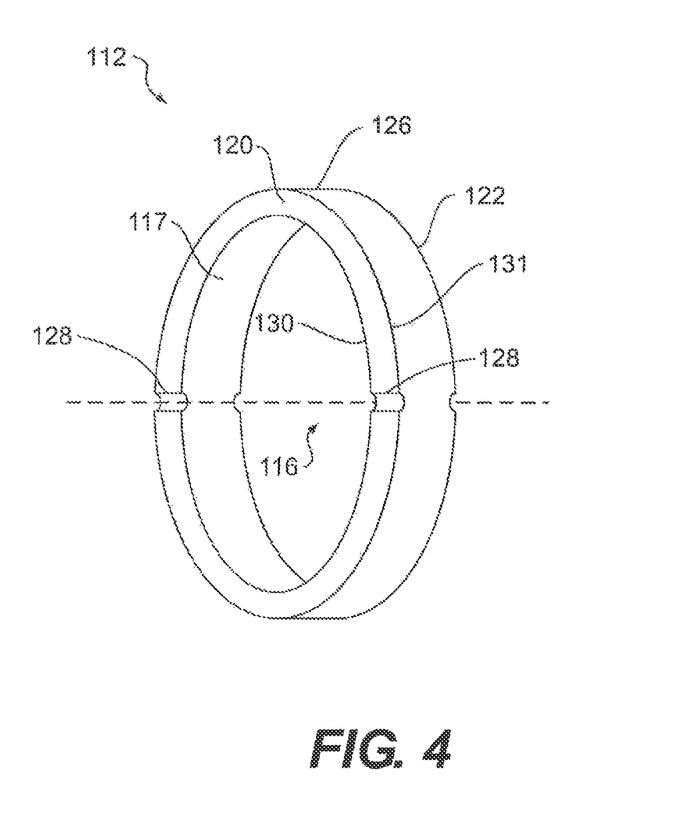
FIG. 4 is an illustration of a thrust bearing for use with the cartridge of FIG. 3.

As can be seen in FIG. 4, first side face 120 of first thrust bearing 112 may include one or more grooves 128 (it is contemplated that the features described in FIG. 4 with respect to first thrust bearing 112 may apply equally to second, third, and fourth thrust bearings 114, 144, 146). Grooves 128 may extend radially outward from a central axis of first thrust bearing 112. Specifically, grooves 128 may extend from an inner edge 130 of first side face 120 to an outer edge 131 of first side face 120. In some embodiments, grooves 128 may have a rounded cross-sectional shape. Alternatively, grooves 128 may have a rectangular, triangular, or other appropriate cross-sectional shape. First side face 120 may include, for example, two grooves 128 spaced 180 degrees apart. In alternative embodiments, first side face 120 may have three grooves 128 every 120 degrees or four grooves 128 every 90 degrees. It is contemplated that second side face 122 may also include one or more grooves 128. Aside from grooves 128, it is contemplated that first side face 120 and second side face 122 may be flat.

Grooves 128 may allow lubricating fluid to pass between interfaces of first thrust bearing 112 and adjacent components. For example, lubricating fluid may flow through grooves 128 on first side face 120, thus lubricating the surface between first side face 120 and side face 72 of bushing 26. Grooves 128 may also enhance a second flow path for lubricating fluid to flow axially outward from pathway 66. For example, fluid may flow along a first pathway through inner gap 118. Fluid may also flow along a second pathway along first side face 120, through outer gap 124, and along side face 122. Enhancing the second flow path with grooves 128 may enhance the ability of cartridge 18 to lubricate downstream components and surfaces (i.e., components and surfaces located axially away from bushing 26).

The number of grooves 128 may be determined based on balancing between lubrication needs and expected thrust loads in cartridge 18. For example, applications with higher thrust loads and slower rotational speeds of components within cartridge 18 may benefit from thrust bearings 112, 114 with fewer grooves. Fewer grooves 128 may allow for more surface area to carry thrust loads, while still providing adequate lubrication between rotating surfaces. By contrast, applications with lower thrust loads and higher rotational speeds of components within cartridge 18 may benefit from thrust bearings 112, 114 with a greater number of grooves 128.

First and second thrust bearings 112, 114 may be composed of sintered metal. The metal may be, for example, steel, bronze, or any other appropriate metal known in the art.

Sintering may create porosity that allows lubricants to flow into and remain within first and second thrust bearings 112, 114. Alternatively, first and second thrust bearings 112, 114 may be composed of a hard plastic or another material.

As a further alternative, first and second thrust bearings 112, 114 may be self-lubricating bearings. In some embodiments, bushing 26, first bearing 28, and second bearing 30 may also be self-lubricating components. Utilizing self-lubricating components may simplify cartridge 28 since lubrication-related elements (e.g., reservoir 64, first and second plug 46, 62, fluid passageway 66, etc.) may be omitted.

It is contemplated that in all previously described aspects, third thrust bearing 144 may be substantially identical to first thrust bearing 112, and fourth thrust bearing 146 may be substantially identical to second thrust bearing 114. For example, third and fourth thrust bearings 144, 146 may be rotatable cylindrical members each having a center bore defining an inner surface. An inner diameter of each of third and fourth thrust bearings 144, 146 may be slightly larger than an outer diameter of track pin 24, thus leaving an inner gap. The inner gap of third and fourth thrust bearings 144, 146 may be in the range of about 0.1-0.5 mm. In some embodiments, the inner gap may be about 0.3 mm. The inner gap may allow lubricating fluid to pass between the inner surface of third and fourth thrust bearings 144, 146 and outer surface 70 of track pin 24.

Third and fourth thrust bearings 144, 146 may be sized such that an outer gap remains between an outer surface of third and fourth thrust bearings 144, 146 and a radially innermost surface of first seal arrangement 86. The outer gap may range from about 0.2-1.0 mm. In some embodiments, the outer gap may be about 0.5 mm.

Third thrust bearing 144 may be configured to bear thrust loads transmitted between bushing 26 and second bearing 30. Third thrust bearing 144 may be configured to not bear radial loads. No structure may contact a radially outermost surface of third thrust bearing 144. A first side face of third thrust bearing 144 may be configured to contact a side face of bushing 26. A second side face of third thrust bearing 144 may be configured to contact a radially interior portion of a lateral surface of second bearing 30. It is contemplated that a ratio of a radial thickness of third thrust bearing 144 and a radial thickness of second bearing 30 may be about 0.25 to 0.5. Fourth thrust bearing 146 may be configured to bear thrust loads transmitted between second bearing 30 and second collar 34. Fourth thrust bearing 146 may be configured to not bear radial loads. No structure may contact a radially outermost surface of fourth thrust bearing 146. A first side face of fourth thrust bearing 146 may be configured to contact a first face of second bearing 30. A second side face of fourth thrust bearing 146 may be configured to contact a radially interior portion of a lateral surface of second collar 34 It is contemplated that a ratio of a radial thickness of second thrust bearing 146 and a radial thickness of second collar 34 may be about 0.25 to 0.5. Third and fourth thrust bearings 144, 146 may also include grooves 128, be composed of sintered metal, and/or be self-lubricating.

Figure 5:
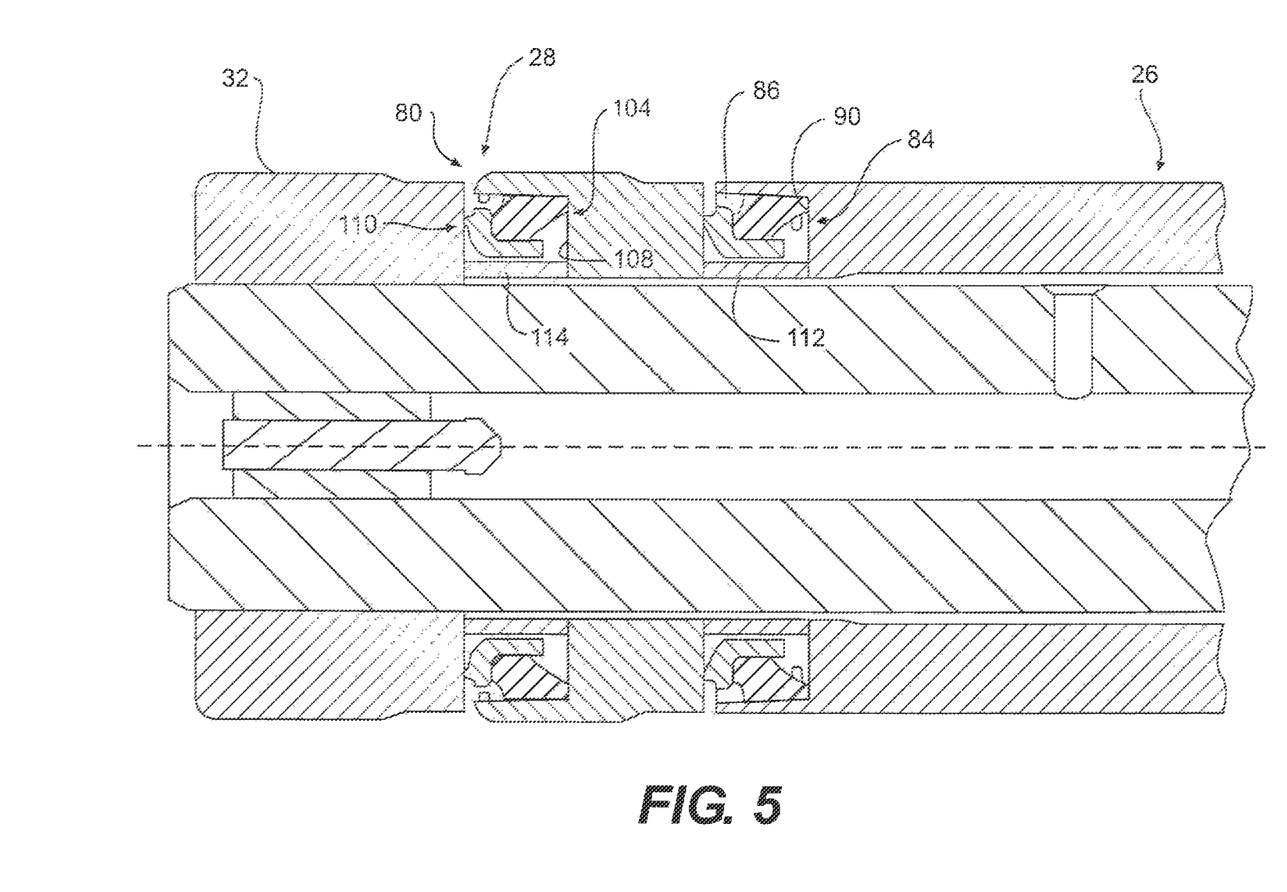
FIG. 5 is a cross-sectional view of an alternative embodiment of the cartridge of FIG. 3.

FIG. 5 may provide an alternative embodiment of cartridge 18. In the embodiment of FIG. 5, cutout 84 may be located in bushing 26. Additionally, cutout 104 may be located on a first face 80 of first bearing 28. Accordingly, first seal arrangement 86 would be located in cutout 84 of bushing 26, and second seal arrangement 110 would be located in cutout 104 of first bearing 28. In the embodiment of FIG. 5, first collar 32 would be a solid element having no cutout. First thrust bearing 112 would be located between lateral surface 90 of bushing 26 and first bearing 28. Second thrust bearing 114 would be located between lateral surface 108 of first bearing 28 and first collar 32. In all other aspects, the embodiment of FIG. 5 may be substantially the same as the previous embodiments described herein.

Cartridge 18 may be assembled in the following manner. Bushing 26 may slide onto track pin 24 until it reaches a central axial location. First thrust bearing 112 and third thrust bearing 144 may slide onto track pin 24 until first side faces 120 of first thrust bearing 112 and third thrust bearing 144 are adjacent to side faces 72 of bushing 26. A first seal arrangement 86 may be placed into each of first bearing 28 and second bearing 30. First and second bearings 28, 30 may then slide onto track pin 24 until lateral surfaces 90 are adjacent to second side faces 122 of first thrust bearing 112 and third thrust bearing 144. This positions the seal arrangements 86 against side faces 72 of bushing 26.

Second thrust bearing 114 and fourth thrust bearing 146 may slide onto track pin 24 until first side faces 136 of first thrust bearing 114 and third thrust bearing 146 are adjacent to first faces 80 of first bearing 28 and second bearing 30. A second seal arrangement 110 may be placed into each of first collar 32 and second collar 34. First and second collars 32, 34 may then be fit onto track pin 24 until lateral surfaces 108 are adjacent to second side faces 138 of second thrust bearing 114 and fourth thrust bearing 146. This positions the seal arrangements 110 against first faces 80 of first bearing 28 and second bearing 30. First and second collars 32, 34 may be fit onto track pin 24 via friction fitting. In addition or as an alternative to friction fitting, first and second collars 32, 34 may be welded, chemically bonded, or mechanically fastened onto track pin 24. Attaching first and second collars 32, 34 to track pin 24 helps control end play of track chain 10.

INDUSTRIAL APPLICABILITY

The disclosed cartridge may be applicable to any track chain for a track-type machine. The cartridge may include a thrust bearing between each rotatable member and each member that is non rotatable or may stop rotating due to external forces. The disclosed thrust bearings may help reduce galling of surfaces of the cartridge when the surfaces are simultaneously carrying a thrust load and rotating relative to one another. Reducing galling may improve the durability of the cartridge. Furthermore, utilizing a thrust bearing may allow for the bearings of the disclosed cartridge to include planar walls on each lateral side of each bearing as opposed to more complex geometries, thus improving the manufacturability of the bearings.

It will be apparent to those skilled in the art that various modifications and variations can be made to the disclosed cartridge. Other embodiments will be apparent to those skilled in the art from consideration of the specification and practice of the disclosed cartridge. It is intended that the specification and examples be considered as exemplary only, with a true scope being indicated by the following claims.

What is claimed is:
1. A cartridge for a track chain, comprising:
   a track pin;
   a rotatable bushing and a rotatable bearing located on the track pin, the rotatable bushing including a first cutout housing a first seal, and the bearing including a second cutout housing a second seal;
   a first thrust bearing located on the track pin between the rotatable bearing and the rotatable bushing, the first thrust bearing being configured to contact the rotatable bearing and configured to contact the rotatable bushing, the first thrust bearing being configured to bear thrust loads and not radial loads;

a collar located at an end of the track pin, the collar being a solid element having no cutout; and a second thrust bearing located between the rotatable bearing and the collar, the second thrust bearing being configured to contact the rotatable bearing and configured to contact the collar, the second thrust bearing being configured to bear thrust loads and not radial loads, wherein the first seal is located radially outward of the first thrust bearing such that an outer gap exists between an outer surface of the first thrust bearing and the first seal.

2. The cartridge of claim 1, wherein the first thrust bearing and the second thrust bearing are each rotatable about the track pin, and the collar is not rotatable with respect to the track pin.

3. The cartridge of claim 1, wherein the first and second thrust bearings are substantially cylindrical in shape with a central bore.

4. The cartridge of claim 3, wherein the first and second thrust bearings are composed of a sintered material.

5. The cartridge of claim 3, wherein each of the first and second thrust bearings include one or more radially extending grooves on a face of each of the first and second thrust bearings.

6. The cartridge of claim 5, wherein the one or more radially extending grooves include two radially extending grooves located 180 degrees apart.

7. The cartridge of claim 1, wherein a thickness of the first thrust bearing is between approximately one fourth and one half of a thickness of the collar.

8. The cartridge of claim 1, wherein the outer gap is between about 0.2 and 1.0 mm.

9. The cartridge of claim 1, further including a second end that is symmetrical to the first end.

10. A cartridge for a track chain, comprising:

a track pin;

a bushing located on the track pin, the bushing including a first cutout housing a first seal and a second cutout housing a second seal;

a first bearing located on the track pin on a first side of the bushing, and a second bearing located on the track pin on a second side of the bushing, the first bearing including a third cutout housing a third seal, and the second bearing including a fourth cutout housing a fourth seal;

a first collar located on a first end of the track pin, and a second collar located on a second end of the track pin, the first and second collars being solid elements having no cutouts; and a first thrust bearing configured to contact the first bearing and configured to contact the bushing, a second thrust bearing configured to contact the first bearing and configured to contact the first collar, a third thrust bearing configured to contact the bushing and configured to contact the second bearing, and a fourth thrust bearing configured to contact the second bearing and configured to contact the second collar, wherein the first, second, third, and fourth thrust bearings are configured to bear thrust loads and not radial loads, wherein the first seal is located radially outward of the first thrust bearing such that an outer gap exists between an outer surface of the first thrust bearing and the first seal.

11. The cartridge of claim 10, wherein the bushing, the first bearing, the second bearing, and the first, second, third, and fourth thrust bearings are each rotatable about the track pin.

12. The cartridge of claim 10, wherein each of the first, second, third, and fourth thrust bearings is substantially cylindrical in shape with a center bore.

13. The cartridge of claim 12, wherein each of the first, second, third, and fourth thrust bearings is composed of a sintered material.

14. The cartridge of claim 12, wherein each of the first, second, third, and fourth thrust bearings includes one or more radially extending grooves on a face of each of the first, second, third, and fourth thrust bearings.

15. The cartridge of claim 14, wherein the one or more radially extending grooves include two radially extending grooves located 180 degrees apart.

16. The cartridge of claim 10, wherein a thickness of the first thrust bearing is between approximately one fourth and one half of a thickness of the first collar.

17. The cartridge of claim 10, wherein the outer gap is between about 0.2 and 1.0 mm.

18. A track chain, comprising:

a track pin;

a bushing located on the track pin, the bushing including a first cutout housing a first seal and a second cutout housing a second seal;

a first bearing located on the track pin on a first side of the bushing, and a second bearing located on the track pin on a second side of the bushing, the first bearing including a third cutout housing a third seal, and the second bearing including a fourth cutout housing a fourth seal, wherein a first inner link is attached to the first bearing, and a second inner link is attached to the second bearing;

a first collar located on a first end of the track pin, and a second collar located on a second end of the track pin, the first and second collars being solid elements having no cutouts, wherein a first outer link is attached to the first collar, and a second outer link attached to the second collar; and a first thrust bearing configured to contact the first bearing and configured to contact the bushing, a second thrust bearing configured to contact the first bearing and configured to contact the first collar, a third thrust bearing configured to contact the bushing and configured to contact the second bearing, and a fourth thrust bearing configured to contact the second bearing and configured to contact the second collar, wherein the first, second, third, and fourth thrust bearings are configured to bear thrust loads and not radial loads, wherein the first seal is located radially outward of the first thrust bearing such that an outer gap exists between an outer surface of the first thrust bearing and the first seal.

\* \* \* \* \*